(12) United States Patent
Rodriguez Bravo

(10) Patent No.: US 11,610,502 B2
(45) Date of Patent: Mar. 21, 2023

(54) PORTABLE COMPUTING DEVICE FOR LEARNING MATHEMATICAL CONCEPTS

(71) Applicant: KYNDRYL, INC., New York, NY (US)

(72) Inventor: Cesar Augusto Rodriguez Bravo, Alajuela (CR)

(73) Assignee: Kyndryl, Inc., New York, NY (US)

(*) Notice: Subject to any disclaimer, the term of this patent is extended or adjusted under 35 U.S.C. 154(b) by 706 days.

(21) Appl. No.: 16/202,291

(22) Filed: Nov. 28, 2018

(65) Prior Publication Data

US 2020/0168114 A1    May 28, 2020

(51) Int. Cl.
| | | |
|---|---|---|
| G09B 7/02 | (2006.01) | |
| G09B 23/02 | (2006.01) | |
| G06N 5/02 | (2023.01) | |
| G06N 5/022 | (2023.01) | |

(52) U.S. Cl.
CPC ............... *G09B 7/02* (2013.01); *G06N 5/022* (2013.01); *G09B 23/02* (2013.01)

(58) Field of Classification Search
CPC .......... G09B 23/02; G09B 7/02; G06N 3/008; G06N 5/02; G06N 5/022
See application file for complete search history.

(56) References Cited

U.S. PATENT DOCUMENTS

| | | |
|---|---|---|
| 3,235,975 A | 2/1966 | Pierson |
| 6,142,784 A | 11/2000 | Wood |
| 6,882,824 B2 | 4/2005 | Wood |
| 7,029,283 B2 | 4/2006 | Marcus |

(Continued)

FOREIGN PATENT DOCUMENTS

| | | |
|---|---|---|
| CN | 101329731 A | 12/2008 |
| CN | 202855129 | 4/2013 |

(Continued)

OTHER PUBLICATIONS

Tyche, True AI (Artificial Intelligence) Companion for Kids, Jan. 17, 2018, Retrieved from Internet: URL: https://www.kickstarter.com/projects/407592806/tyche-the-true-ai-companion-for-kids, 27 pages.

(Continued)

*Primary Examiner* — Eddy Saint-Vil
(74) *Attorney, Agent, or Firm* — Tutunjian & Bitetto, P.C.; Erik Swanson

(57) ABSTRACT

A system and method for assisted-learning with a portable computing device that includes requesting that a user complete a mathematical challenge by arranging real-world objects in an environment to form an arrangement according to the mathematical challenge, optionally receiving an input from the user that the arrangement is complete, activating a camera of a portable computing device located in the environment with the user to capture an image of the arrangement, wherein the image is received from the portable computing device over a network, evaluating the arrangement using a visual recognition engine to determine whether the arrangement successfully completes the mathematical challenge, and providing at least one of a visual feedback and an audible feedback to the user.

20 Claims, 13 Drawing Sheets

(56) References Cited

U.S. PATENT DOCUMENTS

| | | | |
|---|---|---|---|
| 7,056,124 B1* | 6/2006 | Scheuring | G09B 7/02 434/322 |
| 7,428,994 B1 | 9/2008 | Jeffway, Jr. et al. | |
| 8,376,803 B2 | 2/2013 | Oonaka | |
| 9,814,993 B2 | 11/2017 | Ponomarev et al. | |
| 2002/0042713 A1 | 4/2002 | Kim et al. | |
| 2002/0126905 A1 | 9/2002 | Suzuki | |
| 2004/0219496 A1 | 11/2004 | Stevinson | |
| 2006/0062467 A1 | 3/2006 | Zou | |
| 2007/0198128 A1* | 8/2007 | Ziegler | G06N 3/008 700/245 |
| 2012/0009557 A1* | 1/2012 | Marcus | G09B 7/02 434/323 |
| 2012/0122066 A1 | 5/2012 | Dohring | |
| 2012/0258436 A1* | 10/2012 | Lee | G09B 19/003 434/362 |
| 2014/0342331 A1* | 11/2014 | Freeman | G09B 23/288 434/265 |
| 2015/0125835 A1* | 5/2015 | Wittich | G09B 5/065 434/169 |
| 2017/0018198 A1* | 1/2017 | Lee | G09B 19/00 |
| 2017/0036116 A1 | 2/2017 | Cohen et al. | |
| 2018/0114464 A1* | 4/2018 | Cho | G09B 23/02 |

FOREIGN PATENT DOCUMENTS

| | | |
|---|---|---|
| CN | 105169722 | 12/2015 |
| CN | 205928670 | 2/2017 |
| WO | WO0169830 | 9/2001 |
| WO | WO2017164825 | 9/2017 |

OTHER PUBLICATIONS

Woobo: The Talking Robot Inspiring Curious Kids to Explore, Jan. 17, 2018, Retrieved from Internet: URL: https://www.kickstarter.com/projects/702843172/woobo-a-smart-companion-for-curious-kids, 41 pages.

Robot Toys for Toddlers, Retrieved from Internet: URL: https://www.buzzparent.com/toddlers/robot-toys-toddlers/, 10 pages (no date available).

Chandra, Vinesh, Teaching and Learning Mathematics With Robotics in Middle-Years of Schooling, Retrieved from Internet: URL: https://eprints.qut.edu.au/39730/, (2010), 2 pages.

Nao Robot Teach Simple Math, Retrieved from Internet: URL: https://www.youtube.com/watch?v=bPrtsFocMoo, RobotLAB Inc., Published on Jun. 28, 2017, 3 pages.

U.S. Appl. No. 16/202,235, filed Nov. 28, 2018.

Nick Statt, The Leka Smart Toy is a Robot for Children With Developmental Disabilities, Retrieved from Internet: URL: https://www.theverge.com/ces/2017/1/4/14167590/leka-smart-toy-robot-autism-learning-tool-ces-2017, 5 pages.

McReynolds et al., Toys That Listen: A Study of Parents, Children, and Internet-Connected Toys, Retrieved from Internet: URL: https://dl.acm.org/citation.cfm?id=3025735, Proceeding CHI '17 Proceedings of the 2017 CHI Conference on Human Factors in Computing Systems pp. 5197-5207, Denver, Colorado, USA—May 6-11, 2017, ACM New York, NY, USA © 2017, table of contents ISBN: 978-1-4503-4655-9 doi>10.1145/3025453.3025735.

Amazon, Shop Movie and TV Toys, Amazon.com: CogniToys Dino, Powered by IBM Watson, Kids Cognitiv . . . https://www.amazon.com/CogniToys-Powered-Cognitive-Electronic-Lea . . . ; Jun. 21, 2018, 13 pages.

U.S. Appl. No. 16/202,362, filed Nov. 28, 2018.

Mell, Peter et al.; "The NIST Definition of Cloud Computing;" National Institute of Standards and Technology; Special Publication 800-145; Sep. 2011; 7 pages.

Murphy, Jason A.; List of IBM Patents or Patent Applications Treated as Related; May 28, 2021; 1 page.

* cited by examiner

PORTABLE COMPUTING DEVICE FOR LEARNING MATHEMATICAL CONCEPTS

TECHNICAL FIELD

The present invention relates to systems and methods for assisted learning, and more specifically the embodiments of an assisted learning system for learning mathematical concepts.

BACKGROUND

Many children begin learning math at a young age. Often times, children learn math from conventional sources, such as classes, textbooks, parents, television, and teachers.

SUMMARY

An embodiment of the present invention relates to a method, and associated computer system and computer program product, for assisted learning with a portable computing device. A processor of a computing system requests that a user complete a mathematical challenge by arranging real-world objects in an environment to form an arrangement according to the mathematical challenge. An input from the user that the arrangement is complete is received. A camera of a portable computing device located in the environment with the user is activated to capture an image of the arrangement, wherein the image is received from the portable computing device over a network. The arrangement is evaluated using a visual recognition engine to determine whether the arrangement successfully completes the mathematical challenge. At least one of a visual feedback and an audible feedback is provided to the user.

DETAILED DESCRIPTION

Figure 1:
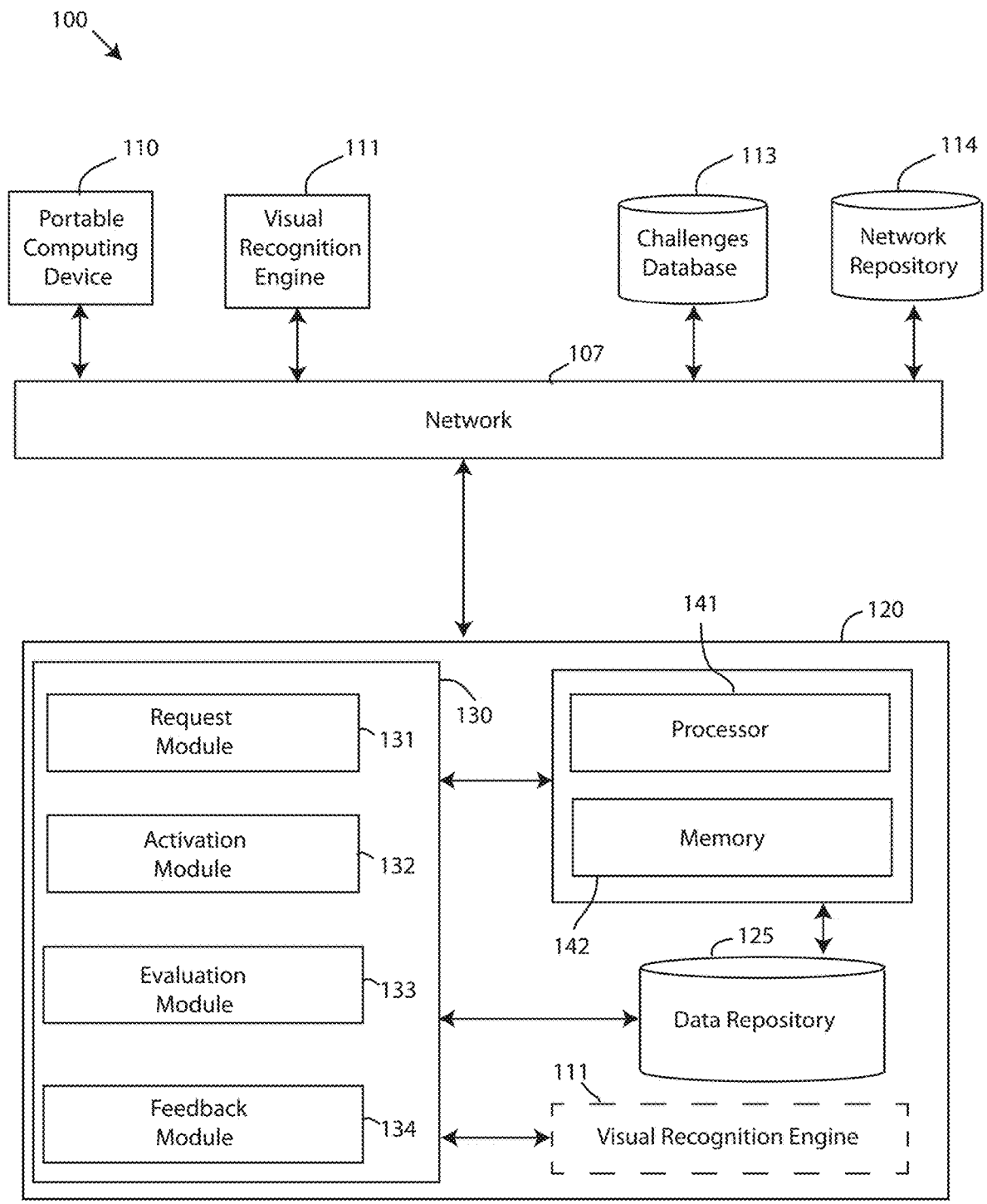
FIG. 1 depicts a block diagram of an assisted learning system, in accordance with embodiments of the present invention.

Referring to the drawings, FIG. 1 depicts a block diagram of an assisted learning system 100, in accordance with embodiments of the present invention. The assisted learning system 100 is a system for learning mathematical concepts and object-identification concepts. The assisted learning system 100 may be useful for users, such as children, who are beginning to learn math and real-world objects.

Embodiments of the assisted learning system 100 may be alternatively referred to as a math learning system, an object identification system, an interactive challenges system a mathematical concept learning game system, and the like.

The assisted learning system 100 includes a computing system 120. Embodiments of the computing system 120 include a computer system, a computer, a server, one or more servers, a backend computing system, and the like.

Furthermore, the assisted learning system 100 includes a portable computing device 110, a visual recognition engine 111, and a challenges database 113 that are communicatively coupled to the computing system 120 over a network 107. For instance, information/data is transmitted to and/or received from the portable computing device 110, the visual recognition system 111, and the challenges database 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the users preferences, user game activity, user high scores, user location, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the users' preferences, user game activity, user high scores, user location, etc., and the like, to generate both historical and predictive reports regarding a particular user or a particular user learning progress. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The portable computing device 110 is a computing device that can be used by a user, such as a child, in a physical environment. In an exemplary embodiment, the portable computing device 110 is a robot that may support programmable movement. In other embodiments, the portable computing device 110 can be a cell phone, a mobile computing device, a smartphone, a tablet computer, a laptop computer, a wearable computing device, a smartwatch, an internet-connected doll or action figure, and the like. For instance, a portable computing device 110 may be operated by the user to learn mathematical and spatial concepts and identify object in an environment shared by the user. The portable computing device 110 can include hardware functionality such as a speaker for emitting a sound, a vibration motor for creating vibrations, a display for displaying images, text, messages, videos, pictorial sequences, etc., a light emitting element for emitting a light, a receiver for receiving communications, a transmitter for transmitting signals, a microphone for capturing real-world audio, and other similar features and hardware of a computer, smartphone, smartwatch, cell phone, tablet computer, and the like.

Figure 2:
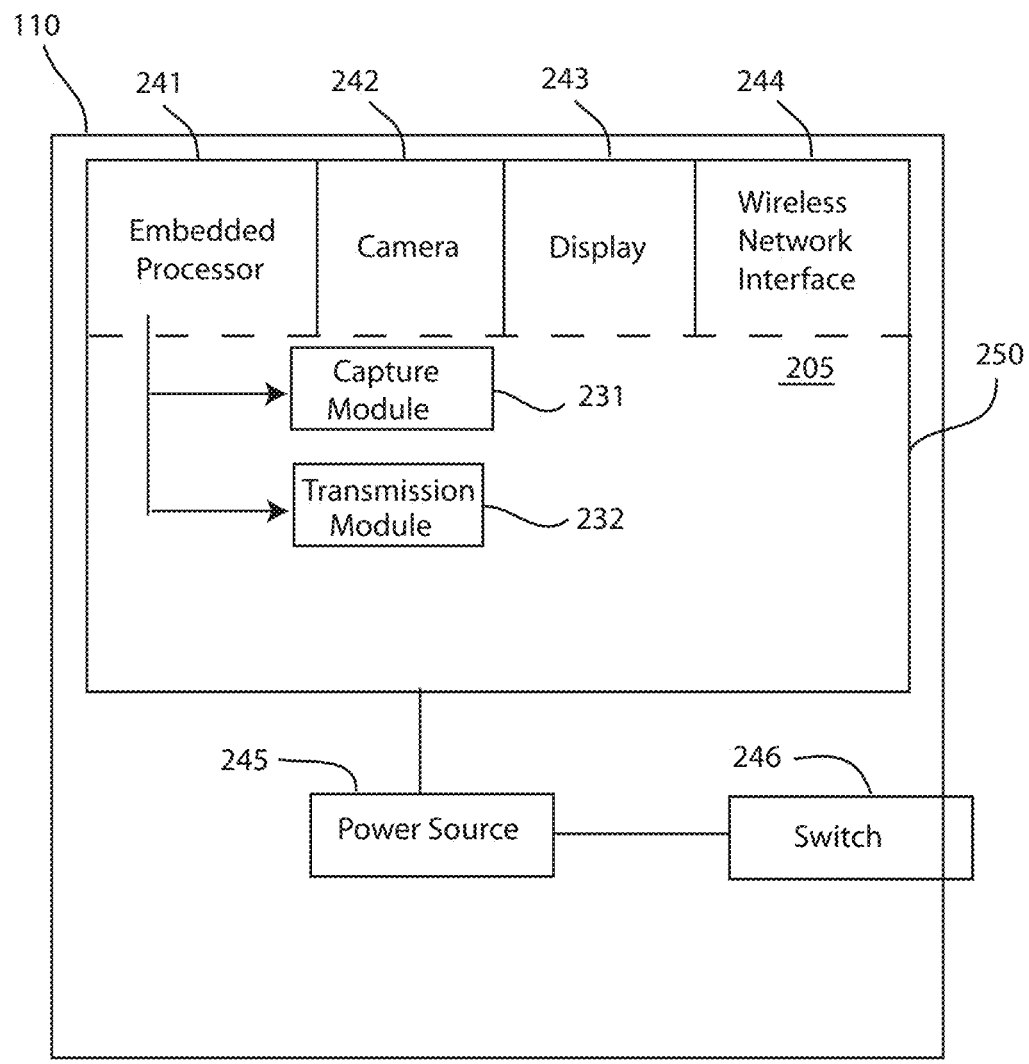
FIG. 2 depicts a block diagram of a portable computing device, in accordance with embodiments of the present invention.

FIG. 2 depicts a block diagram of a portable computing device 110, in accordance with embodiments of the present invention. The portable computing device 110 includes hardware and software components, and can be considered a microcomputer. The portable computing device 110 includes a specialized integrated circuit 250. The specialized integrated circuit may be specialized and dedicated to perform only the methods described herein. Embodiments of the specialized integrated circuit 250 may be an application specific integrated circuit (ASIC). In other exemplary embodiment, the integrated circuit 250 is a "Raspberry Pi" sensor component of a microcomputer. Furthermore, embodiments of the specialized integrated circuit 250 may include an embedded processor 241, a camera 242, a display 243, and a wireless network interface 244. The circuit 250 is also coupled to a microphone and a speaker, not shown in FIG. 2. The portable computing device 110 further includes a power source 245, such as one or more batteries. Software components of the portable computing device 110 are located in a memory system 205 of the portable computing device 110, or a memory system coupled to the specialized integrated circuit 250. The specialized integrated circuit 250 includes the embedded processor 241 for implementing the tasks associated with the portable computing device 110. In an exemplary embodiment, the portable computing device 110 communicates with the computing system 120 to transmit information/data from collected audio and color data collected by the camera 242. For example, the specialized integrated circuit 250 utilizes the wireless network interface 244 for transmitting digital image data, over a network 107, to the computing system 120. Alternatively, the wireless network interface 244 may securely and exclusively connect to a user computing device (e.g. smartphone) associated with a user, over a short range communication network, and the user computing device can transmit additional environmental data (e.g. location data, images, etc.) to the computing system 120.

The portable computing device 110 is equipped with or coupled to a camera 242 to detect, photograph, scan, analyze, or otherwise capture digital data of one or more objects arranged by a user within an environment to attempt to pass a challenge presented to the user. The camera 242 can be a charge coupling device (CCD) imaging sensor or similar imaging sensor to detect, photograph, scan, analyze, or otherwise capture images of objects arranged by a user. In an exemplary embodiment, the camera 242 may be a micro digital camera. Further, the portable computing device 110 is equipped with or coupled to a display 243. The display 243 includes a graphical user interface (GUI) that displays messages, text, results, instructions, questions, prompts, etc. received from the computing system 120 in response to the user operating the portable computing device 110 in a variety of ways described in greater detail infra. The GUI can be modified or otherwise augmented overtime to reflect a progress made by a user that is learning concepts associated with the assisted learning system 100. Moreover, the portable computing device 110 includes a switch 246. The switch 246 may be partially located external to a housing of the portable computing device 110. The switch 246 can be a mechanical switch, or an electromechanical switch. For instance, the switch 246 is a button accessible to the user operating the portable computing device 110, wherein if the user depresses the switch 246, the power source 245 is activated (e.g. a circuit is completed by metal-to-metal contact, or other suitable means to employ a switch to turn on a power source may be used). Activating the power source 245 provides power to the specialized integrated circuit 250, and the camera 242 can be automatically activated as power is provided to the specialized integrated circuit 250 to begin an object identification procedure. By way of example, a user presses the switch 246, or a portion of the switch accessible to the user external to the housing, which powers up the specialized integrated circuit 250 to activate the camera 242 for capturing and/or gathering real-world signals needed to identify a number, arrangement, etc. of an object.

Additionally, the portable computing device 110 includes software components, such as a capture module 231 and a transmission module 233. A "module" refers to a hardware based module, software based module, or a module may be a combination of hardware and software. Hardware based modules include self-contained components such as chipsets, specialized circuitry and one or more memory devices, while a software-based module is part of a program code or linked to the program code containing specific programmed instructions, which may be loaded in the memory system 205 of the portable computing device 110 and/or in a memory coupled to the specialized integrated circuit 250. A module (whether hardware, software, or a combination thereof) may be designed to implement or execute one or more particular functions or routines.

The capture module 231 includes one or more components of hardware and/or software program code for capturing or otherwise obtaining digital data of one or more objects arranged by the user in the user's environment. The capture module 231 can be activate and deactivated by the computing system 120 remotely to begin the identification/detection process. Alternatively, the user can control the operation of the camera 242 by pressing switch 246 or another physical switch located on the portable computing device 110. The capture module 231 or other module of the portable computing device 110 can establish a connection or link between the portable computing device 110 and the user computing device, using the wireless network interface 244. The link between the portable computing device 110 and the user computing device may be established using Bluetooth® technology, near field communication (NFC), and/or a combination thereof.

The transmission module 232 includes one or more components of hardware and/or software program code for transmitting the code from the portable computing device 110 to the computing system 120 over network 107. For instance, the transmission module 232 calls an API and uploads the digital image data to the computing system 120 evaluation by the visual recognition engine 111. Additional modules are included with the portable computing device 110, but are not shown in FIG. 2, such as a display module that includes one or more components of hardware and/or software program code for displaying messages, text, images, colors, numbers, exemplary arrangements, instructions, etc. In some embodiments, the portable computing device 110 receives communications, messages, instructions, etc. directly from the computing system 120, and the display module displays the communications, messages, instructions, etc. on the display 243. In other embodiments, the communications, messages, instructions, etc. are received by a linked user computing device, and the user computing device directly displays the results, or sends the data to the portable computing device 110 over the short range communication network linking the user computing device and the display module displays the communications, messages, instructions, etc. on display 243.

Figure 3:
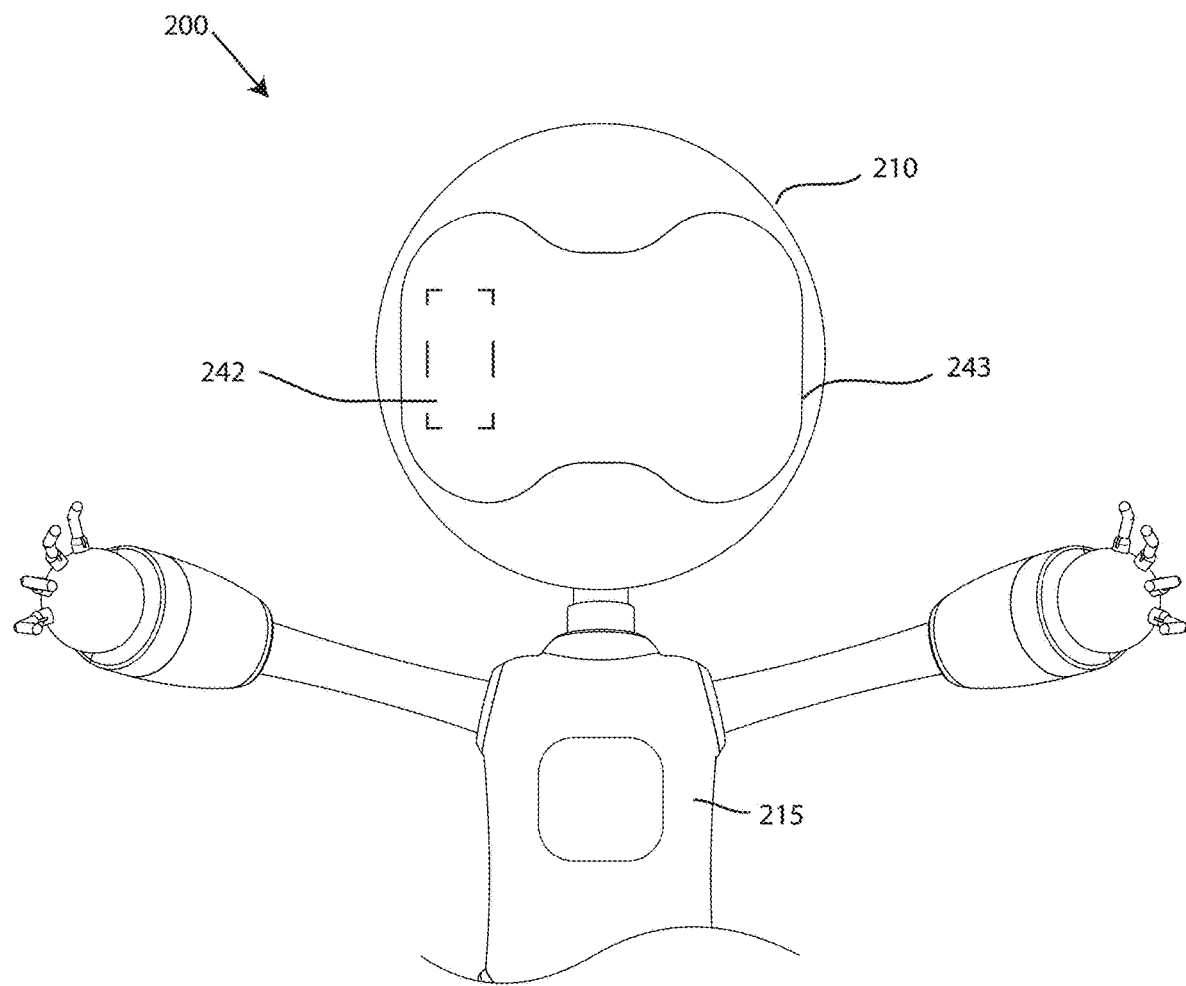
FIG. 3 depicts a perspective view of a portable computing device, in accordance with embodiments of the present invention.

FIG. 3 depicts a perspective view of a portable computing device 110, in accordance with embodiments of the present invention. In the illustrated embodiment, the portable computing device 110 is a robot 200 having a head portion 210 and a body portion 215. The head portion 210 includes a display 243; the camera 242 is also located in the head portion 210. While one display 243 and one camera 242 are shown in the illustrated embodiment, the robot 200 can include more than one display 243 and more than one camera 242 positioned on the head portion 210 and/or the body portion 215 of the robot 200. The overall shape and size of the head portion 210 and the body portion 215 can vary to accommodate various needs, designs, applications, and the like. Furthermore, the robot 200 can include one or more sensors in addition to the camera 242, coupled to the integrated circuit 250. The one or more sensors can include a color sensor, a temperature sensor for detecting a temperature of the environment, a moisture sensor for detecting a moisture level of the environment, a GPS sensor for tracking a location of the robot 200, accelerometers, gyroscopes, and other sensors for obtaining physical characteristics of a movement of the robot 200. Further, the robot 200 may require ultra-low processing requirements to operate the camera 242 to keep computer processing requirements to a minimum, or to allow for those spared resources to be used elsewhere, such as for movement of the robot 200. For instance, the robot 200 can programmed to move around within an environment to enhance the learning experience of the user. The robot 200 may be comprised of plastic, metal, or other materials can be used in combination with plastic or without plastic to form the robot 200.

Referring back to FIG. 1, the assisted learning system 100 includes visual recognition engine 111. The visual recognition engine 111 is a software application, engine, or tool for analyzing a content or insights of an object, scene, face, color, and the like. In an exemplary embodiment, the visual recognition engine is IBM WATSON VISUAL RECOGNITION SERVICE. The computing system 120 may utilize the visual recognition engine 111 to identify and count objects arranged in a real-world environment. In the illustrated embodiment, the visual recognition engine 111 is a remote service accessed by the computing system 120 over network 107; however, a visual recognition software application can be installed directly onto the computing system 120.

The assisted learning system 100 also includes a challenges database 112. The challenges database 112 is a database or other storage device that includes a plurality various challenges, mini-games, learning modules, games, updates, and the like. The computing system 120 can access the challenges database 113 to provide new and evolving challenges to the user via the portable computing device 110. The challenges database 113 is updated over time to include new challenges. Further, the computing system 120 can obtain new challenges from the challenges database 113 as the user progresses through challenges and is ready for challenges with increased difficulty.

Furthermore, the computing system 120 of the assisted learning system 100 is equipped with a memory device 142 which stores various data/information/code, and a processor 141 for implementing the tasks associated with the assisted learning system 100. An assisted learning application 130 is loaded in the memory device 142 of the computing system 120. The assisted learning application 130 can be an interface, an application, a program, a module, or a combination of modules. In an exemplary embodiment, the assisted learning application 130 is a software application running on one or more back end servers (e.g. computing system 120), servicing the portable computing device 110 and potentially a linked personal user computing device.

Referring back to FIG. 1, the assisted learning application 130 of the computing system 120 includes a request module 131, an activation module 132, an evaluation module 133, and a game module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The assisted learning application 130 includes a module for selecting a game mode available to the user. The portable computing device 110 supports more than one different mode of operation, such as an interactive math mode, a spatial recognition mode, a training mode, and the like. If the portable computing device 110 is powered on, the user can select a game mode by interacting with a touchscreen display 243 of the portable computing device 110 to select the desired game mode. Alternatively, the user may select a game mode using a voice command. The interactive math mode presents mathematical challenges to the user that the user is prompted to solve using real-world objects located in the environment shared by the user. By way of example, the portable computing device 110 asks the user, "what is the result of 2×3?" and the user locates a total number of objects in the environment and arranges the objects nearby the portable computing device 110. The portable computing device 110 captures the arrangement with the camera 242 and the visual recognition engine 111 is used to count the total number of objects forming the arrangement. If the total number of objects forming the arrangement equals 6, then the user passes the challenge. The portable computing device 110 can audibly and/or visually provide feedback to the user that the user passed or failed the challenge.

The spatial recognition mode presents mathematical challenges to the user that the user is prompted to solve using real-world objects located in the environment shared by the user, with a spatial component. By way of example, the portable computing device 110 asks the user, "please arrange 7 coins from smallest to largest?" and the user locates a number (e.g. 7) of coins (e.g. penny, nickel, dime, quarter) in the environment and attempts to arrange the coins by size nearby the portable computing device 110. The portable computing device 110 captures the arrangement with the camera 242 and the visual recognition engine 111is used to both count the total number of coins forming the arrangement and inspect the arrangement of coins to determine whether the coins are arranged by size in the correct order. If the total number of coins forming the arrangement equals 7, and the coins are arranged correctly from smallest to largest, then the user passes the challenge. The portable computing device 110 can audibly and/or visually provide feedback to the user that the user passed or failed the challenge.

The training mode involves the user using the portable computing device 110 to scan a group of objects arranged by the user or otherwise present in the physical environment of the user. The portable computing device 110 sends the digital data to the computing system 120 which utilizes the visual recognition engine 111 to both identify the object and determine a total number of identified objects that the user has arranged. The user can then ask, "how many objects are in this stack?". The portable computing device 110 can answer the user to help the user learn and/or reinforce mathematical concepts, such as counting, and object identification concepts. By way of example, the user arranges 7 shoes in a pile in front of the portable computing device 110, and the portable computing device 110 captures the arrangement with the camera 242 and the visual recognition engine 111 is used to both identify that the objects in the arrangement are shoes and count the total number of shoes forming the arrangement. The portable computing device 110 audibly and/or visually responds to the user that there are 7 shoes present (i.e. "I see seven shoes")

Moreover, the assisted learning application 130 includes a module for detecting a state of various initialization, default setting, options menus, and startup procedures associated with the portable computing device 110. For instance, the module detects whether the portable computing device 110 is powered on prior o performing any computational processes. The portable computing device 110 can be powered on by pressing a switch, such as switch 246, or can be powered on with a voice command, processed by the computing system 120. The module also detects and/or sets from a user preferences the default language to be used during the interactions with the user. If the default language is English, then the responses, requests, questions, instructions, etc. are output in English, unless translations are requested. The module may provide updates to the options menus that allow the user to vary the learning program.

The request module 131 includes one or more components of hardware and/or software program code for requesting that a user complete a mathematical challenge by arranging real-world objects in an environment to form an arrangement according to the mathematical challenge. A mathematical challenge is a challenge, question, activity, problem, prompt, and the like presented to the user that either directly or indirectly relates to numbers, counting, geometrical shapes, mathematical concepts (e.g. multiplication), sorting, spatial concepts (e.g. size), and the like. The mathematical challenge is a part of a particular learning program or module downloaded from the challenges database 113. Alternatively, the mathematical challenge can be a part of a locally stored software program that has pre-loaded challenges. In an exemplary embodiment, the challenges are loaded onto the portable computing device 110 via a removable external drive (e.g. USB drive). In another embodiment, the requesting module 131 downloads a new challenge or series of challenges over the network 107 from the challenges database 113 or other remote source of challenges.

The mathematical challenge request is transmitted to the portable computing device 110 with instructions to visually display and/or audibly present the mathematical challenge to the user. For example, the portable computing device 110 is instructed to present the mathematical challenge to the user using one or more speakers and/or display 243 of the portable computing device 110. In response to the challenge, the user attempts to complete the challenge by arranging the objects in the manner consistent with the current mathematical challenge. The result of the arranging of the objects is referred to as an arrangement, which is completed by the user in response to the challenge. The arrangement can be a stack of objects, a sorted row of objects, a random pile of objects on the floor, one or more objects held by the user, and the like. Moreover, the request module 131 receives an input from the user that the arrangements complete. The input can be a voice command from the user (e.g. "Ready!") or physical interaction between the user and the portable computing device 110, such as a touch of the display or a pressing of a button. Once the user is finished forming the user's arrangement in response to the challenge, the user communicates hands-free or physically to the portable computing device 110 that the arrangement is, at least in the user's mind, ready for evaluation.

Referring still to FIG. 1, the computing system 120 includes an activation module 132. The activation module 132 includes one or more components of hardware and/or software program code for activating a camera of a portable computing device located in the environment with the user to capture an image of the arrangement. For instance, the camera 242 is remotely activated automatically after receiving the input from the user ("I am done!") The camera 242 captures one or more photographs of the user's arrangement or initiates a live video feed from the perspective of the camera 242. The user can position the portable computing device 110 within the environment so that the camera 242 is facing the arrangement. In an exemplary embodiment of the robot 200 shown in FIG. 3, the user can position the robot so that the display 243 of the head portion 210 of the robot 200 is facing the arrangement, or so that the arrangement is within the field of view of the robot's camera. In another embodiment using robot 200, the user may remotely control the robot 200 in space so that the robot 200 is facing arrangement. The user can control the robot 200 using voice commands or a remote controller, depending on the capabilities of the robot 200. In other embodiments where the portable computing device 110 is a smartphone or other handheld or wearable computing device, the user can manually position the portable computing device 110 so that the arrangement is within a field of view of the device's camera. The portable computing device 110 transmits the data to the computing system 120 for analysis by the visual recognition engine 111 to identify the contents of the arrangement, over network 107. In some cases, the camera 242 may fail to satisfactorily capture the details of the arrangement due to insufficient data received from the camera 242. The activation module 132 can detect that the image data is not successfully obtained by the camera 242 of the portable computing device 110, and then provide feedback to a user to reposition the portable computing device 110 to improve image capturing. In response to the repositioning of the portable computing device 110, the activation module 132 can again activate the camera 242 to photograph or otherwise film the arrangement.

In alternative embodiments, the activation module 132 automatically determines when the user is complete by continuously monitoring the user via the camera 242, and thus an active input step from the user is not required to activate the camera 242 when the user is ready for evaluation of the user's arrangement to trigger activation of the camera 242. In other words, the camera 242 is in a default enabled state when the portable computing device 110 is powered on and/or in a game mode, such that the camera 242 does not need to be activated and deactivated during challenges. For example, if the user has stopped gathering, stacking, arranging, looking for, etc. objects within the environment, the activation module 132 determines that the user is ready to be evaluated. If the user gestures (e.g. raises hand) towards the portable computing device 110 that the user has completed the arrangement in response to the challenge, the activation module 132 determines that the user is ready. In the default enabled state, the user can provide a voice command or otherwise interact with the portable computing device 110 to alert the computing system 120 that the user is ready for evaluation, but the data has already been collected for analysis.

The computing system 120 also includes an evaluation module 133. The evaluation module 133 includes one or more components of hardware and/or software program code for evaluating the arrangement using a visual recognition engine 111 to determine whether the arrangement successfully completes the mathematical challenge. For instance, the evaluation module 133 sends the received digital image data to the visual recognition engine 111 to identify the objects contained in the photograph or video frame(s), count a total number of objects, count of number of each different object, determine whether the objects are sorted by size, determine whether the objects are stacked, determine whether the arrangement of objects forms a geometrical shape, or the like. The results of the visual recognition engine 111 analyzing the image(s) of the arrangement are compared to the mathematical challenge presented to the user to determine whether the user successfully completed the mathematical challenge or has failed the mathematical challenge. For example, if the mathematical challenge presented to the user requested that the user collect "4+4" shoes, and the visual recognition engine 111 determines that the arrangement formed by the user includes eight shoes, then the evaluation mode 133 determines that the user has successfully completed/passed the challenge. If the mathematical challenge presented to the user requested that the user collect "4+4" shoes, and the visual recognition engine 111 determines that the arrangement formed by the user includes seven shoes, then the evaluation mode 133 determines that the user has failed the challenge. If the mathematical challenge presented to the user requested that the user collect "4+4" shoes, and the visual recognition engine 111 determines that the arrangement formed by the user includes eight tennis balls, then the evaluation mode 133 determines that the user has failed the challenge.

Furthermore, the computing system 120 includes a feedback module 134. The feedback module 134 includes one or more components of hardware and/or software program code for providing at least one of a visual feedback and an audible feedback to the use. For instance, the feedback module 134 provides at least one of a visual feedback and an audible feedback to the user. Providing positive visual feedback in the game mode includes displaying a congratulatory message on the portable computing device 110, and providing positive audible feedback includes initiating, a musical sequence associated with a correct answer. Feedback is also provided if the user is incorrect. For example, the feedback module 134 provides the correct answer and/or identified the errors to the user so that the user can learn even if the user is incorrect. If the user is correct, the feedback module 134 can increase a score of the user in the game mode. If the user is incorrect, the feedback module 134 can decrease a score of the. Further, the feedback module 134 can modify or augment a graphical user interface of the portable computing device 110 to display words, numbers, graphics, user progress, user scores, and the like. The portable computing device 110 can be used on a daily basis to learn math in an interactive manner. As a result, the feedback module 134 of the computing system 120 augments the graphical user interface of the portable computing device 110 to update the user's score and learning progress in response to receiving additional results from the various game modes. The learning progress reports can be tracked and monitored over time to formulate suggested changes to a user's learning program, difficulty, etc.

In an exemplary embodiment, the user interacts with the portable computing device 110 by voice commands, which are audio files collected by the portable computing device 110. The computing system 120 converts an audio file received from the portable computing device 110 into text. The audio file is sent to the computing system 120 by the portable computing device 110, in response to collecting the audio from a real-world environment. As the user speaks, one or more microphones of the portable computing device 110 collects the audio and creates a digital audio file (e.g. creates a .mp3 pack) for transmitting to the computing system 120 over the network. The digital file may be packetized and sent over the network as the audio is collected to increase the speed in which the computing system 120 receives and parses the audio file over the network 107. The one or more microphones, when the portable computing device 110 is powered on, can continuously listen for and collect audio of the user so that the user can interact with the portable computing device 110 without needing to prompt the portable computing device 110 to listen for commands. The computing system 120 converts that audio file into text, and on response, parses the text to determine whether the user giving a command to the portable computing device 110. For example, the computing system 120 uses speech-to-text software to convert the audio file into text. The language spoken by the user can also be detected by the computing system 120 using the speech-to-text software as well a translation API associated with a translator software application. The language spoken by the user can be automatically configured as the default language for outputting audible answers or feedback to the user's questions. In response to converting the received audio file to text, the computing system 120 parses the text using natural language processing techniques or comparable techniques to understand what the user is saying. The parsing of the text can include detecting one or more keywords or triggers, such as "I'm ready to be evaluated" or "How many tennis balls are on the floor," which can initiate a particular response by the computing system 120, such as the activation of the camera 242, initiation of the analysis by the visual recognition engine 111, or instructing the portable computing device 110 to display a particular message.

Additionally, the portable computing device 110 can assist learning math and other vocabulary words in a language different from the default language. For instance, the computing system 120 can receive a request from the user that the word associated with the objects in the arrangement be audibly output in a different language that is different than the default language. The computing system 120 receives the request as an audio file, converts the speech into text, and parses the text, as described above, to understand the question of the user. The computing system 120 utilizes translation software to translate the word associated with the object into a different language (e.g. as requested by the user or as the second language denoted in user settings) to determine a translated word. The computing system 120 then instructs the portable computing device 110 to audibly and/or visually output the translated word associated with the object in the different language. As a result, the user can learn math and other vocabulary in more than one language.

Figure 4:
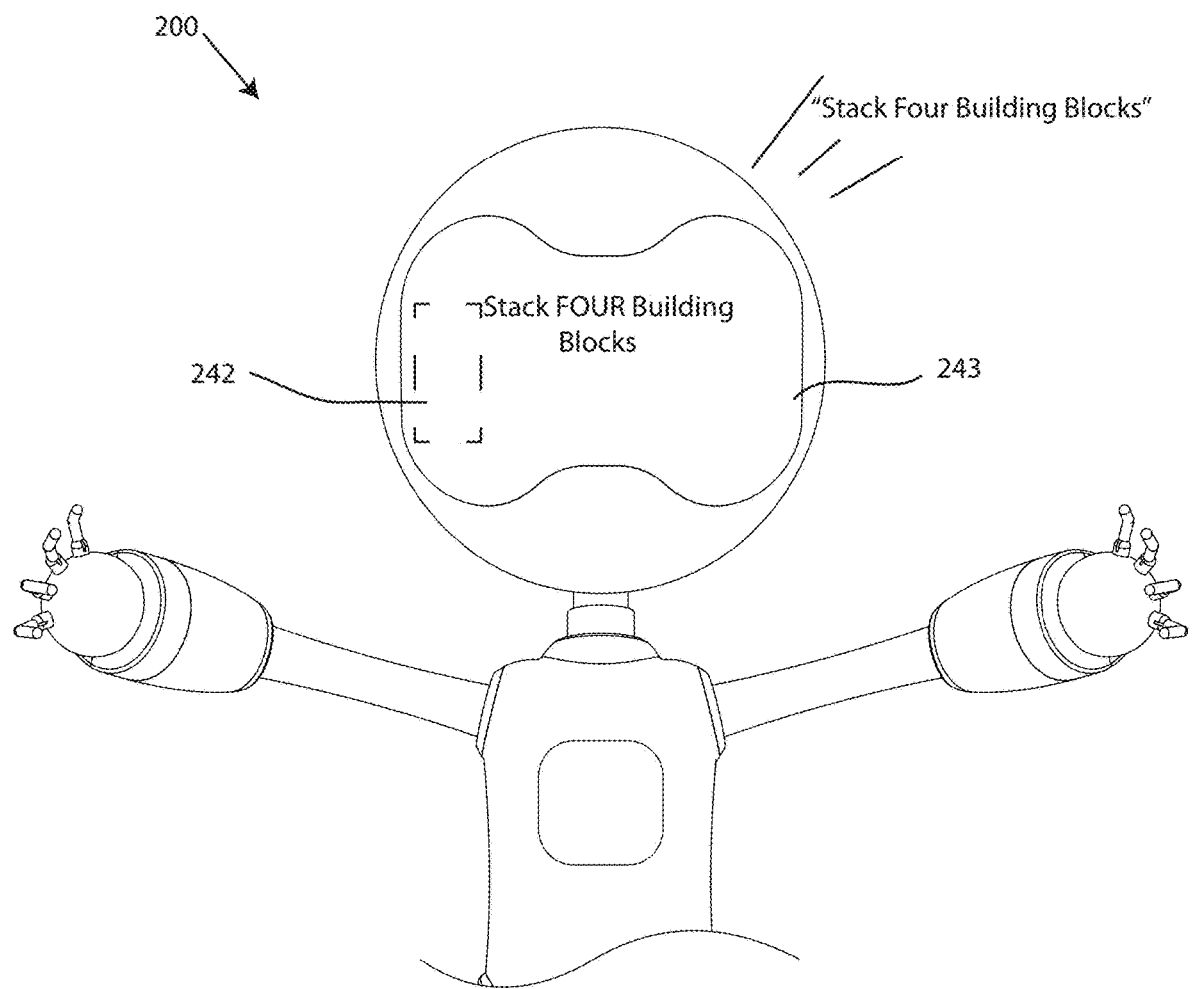
FIG. 4 depicts a schematic view of a robot challenging a user to complete mathematical challenge, in accordance with embodiments of the present invention.
Figure 5:
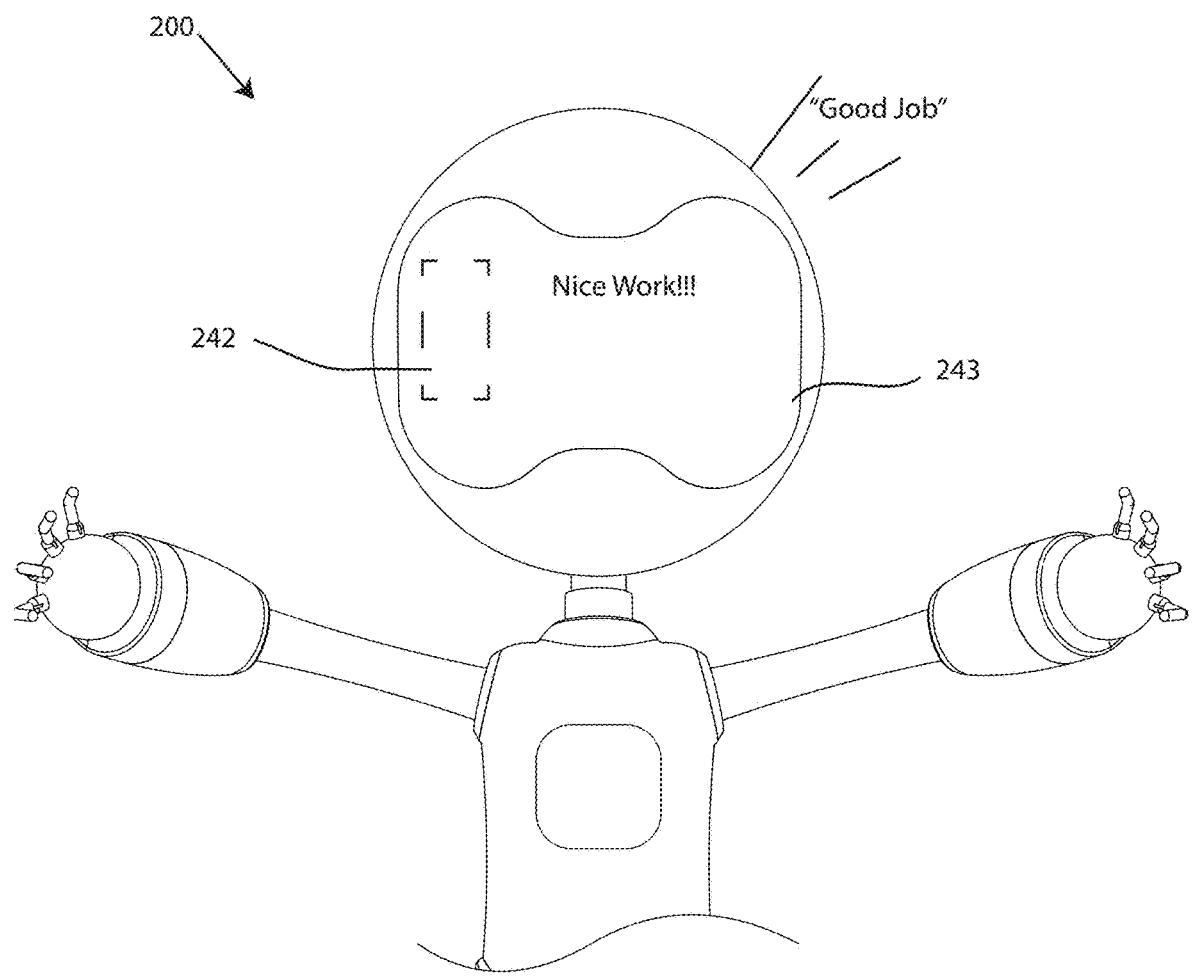
FIG. 5 depicts a schematic view of a robot confirming that the user has correctly completed the challenge, in accordance with embodiments of the present invention.
Figure 6:
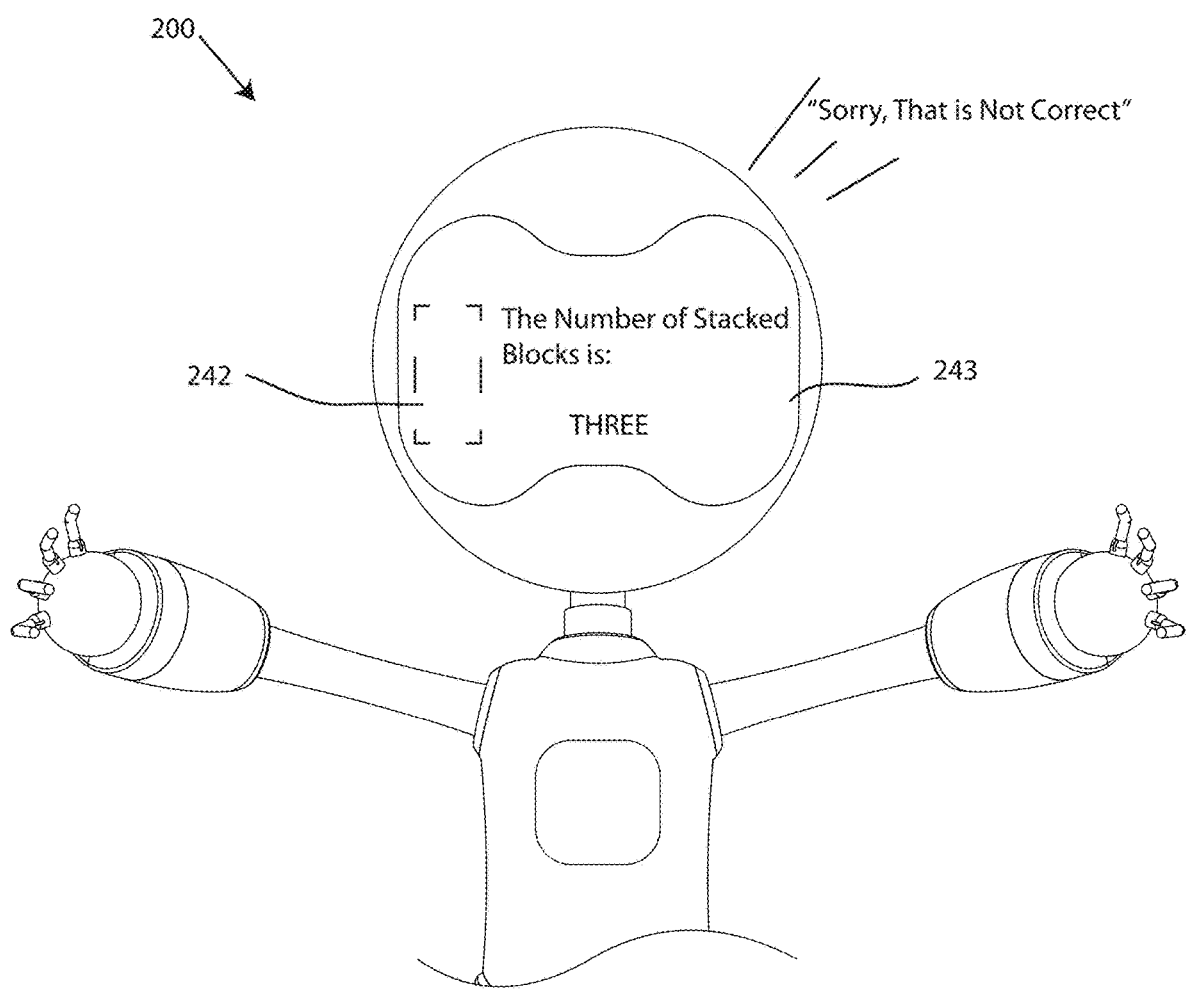
FIG. 6 depicts a schematic view of a robot confirming the user has failed the challenge, in accordance with embodiments of the present invention.

By way of example, the interactive math mode of the portable computing device 110 can be used to challenge a user to stack a specific number of objects. FIG. 4 depicts a schematic view of a robot 200 challenging a user to complete a mathematical challenge, in accordance with embodiments of the present invention. In the illustrated embodiment, the robot 200 asks the user to "Stack Four Building Blocks" while also displaying the message "Stack FOUR Building Blocks." In response, the user searches the user's environment and finds building blocks (e.g. toys), and stacks four building blocks one on top of the other, in front of the of the camera 242 of the robot 200. The robot 200 obtains the image data associated with the stack of building blocks, and confirms that the user has not only arranged the correct number of building blocks, but has also stacked the four building blocks on top of each other, as request in the challenge. FIG. 5 depicts a schematic view of a robot 200 confirming that the user has correctly completed the challenge, in accordance with embodiments of the present invention. As shown in FIG. 5, the robot 200 audibly outputs "Good Job" while also displaying a message "Nice Work!!!" on the display 243. The interactive feedback alerts the user to a successful response to the request/challenge. The user's score increases. However, if the user placed three building blocks in front of the camera 242 of the robot 200 instead of four building blocks, the robot 200 would provide feedback to the user that the user was incorrect or failed the challenge. FIG. 6 depicts a schematic view of a robot confirming the user has failed the challenge, in accordance with embodiments of the present invention. As shown in FIG. 6, the robot 200 audibly outputs "Sorry, that is not correct" while also displaying a message "The Number of Stacked Blocks is: THREE" on the display 243. The interactive feedback alerts the user to an unsuccessful response to the challenge, and provides the user with the correct response so that the user continues to learn. The user's score decreases.

Figure 7:
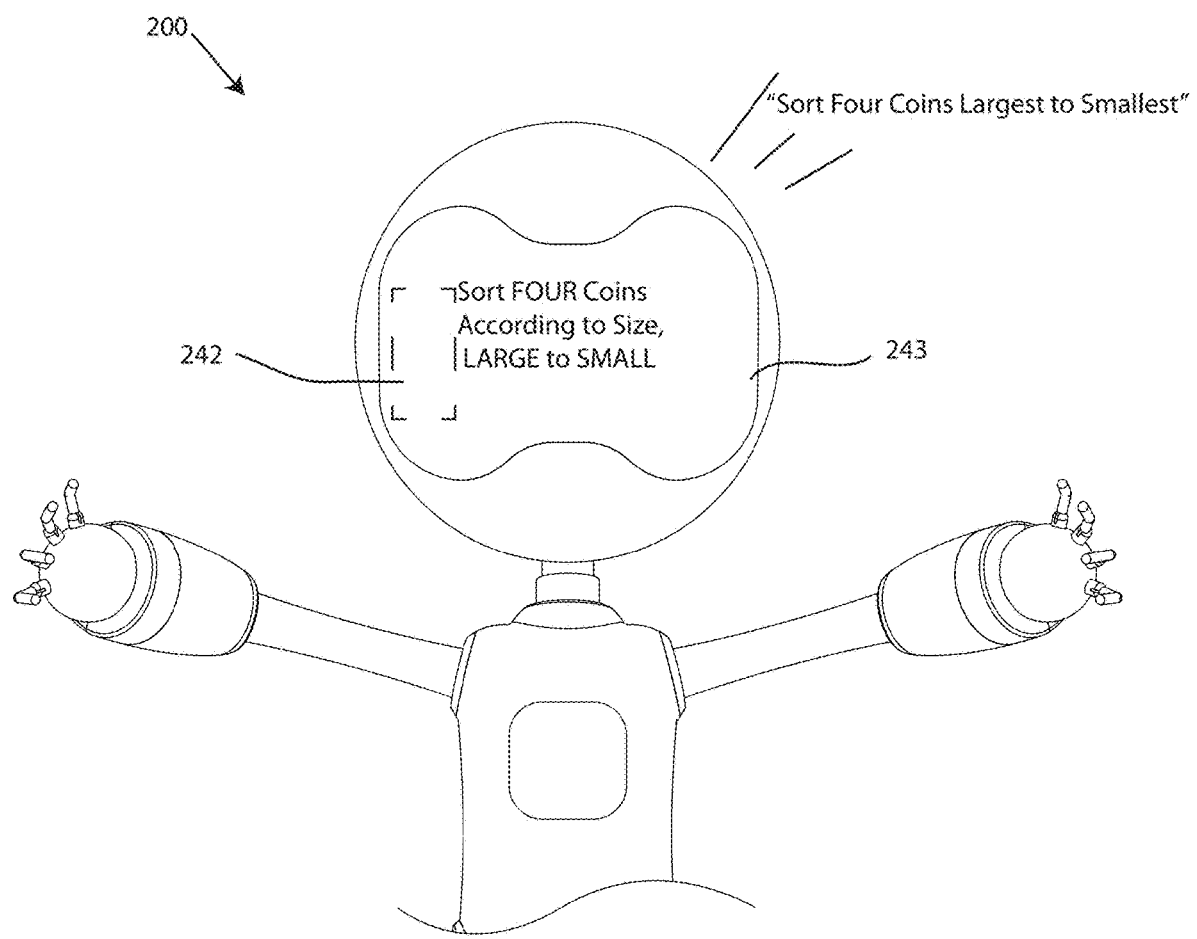
FIG. 7 depicts a schematic view of a robot challenging a user to complete another mathematical challenge, in accordance with embodiments of the present invention.

By way of another example, the spatial recognition mode of the portable computing device 110 can be used to challenge a user to sort a specific number of objects according to size. FIG. 7 depicts a schematic view of a robot 200 challenging a user to complete another mathematical challenge, in accordance with embodiments of the present invention. In the illustrated embodiment, the robot 200 asks the user to "Sort Four Coins Largest to Smallest" while also displaying the message "Sort FOUR coins According to size, LARGE to SMALL." In response, the user searches the user's environment and finds coins (e.g. nickel, dime, quarter), and arranges one quarter, one nickel, and two dimes from left to right, in front of the of the camera 242 of the robot 200. The robot 200 obtains the image data associated with the arrangement of coins, and confirms that the user has not only arranged the correct number of coins, but has also sorted the coins by size, as request in the challenge. The robot 200 confirms that the user has correctly completed the challenge, and audibly outputs "Good Job" while also displaying a message "Nice Work!!!" on the display 243. The interactive feedback alerts the user to a successful response to the request/challenge. The user's score increases. However, if the user arranged the dimes first, or included five coins in front of the camera 242 of the robot 200, the robot 200 would provide feedback to the user that the user was incorrect or failed the challenge. The interactive feedback alerts the user to an unsuccessful response to the challenge, and provides the user with the correct response so that the user continues to learn. The user's score decreases.

Figure 8:
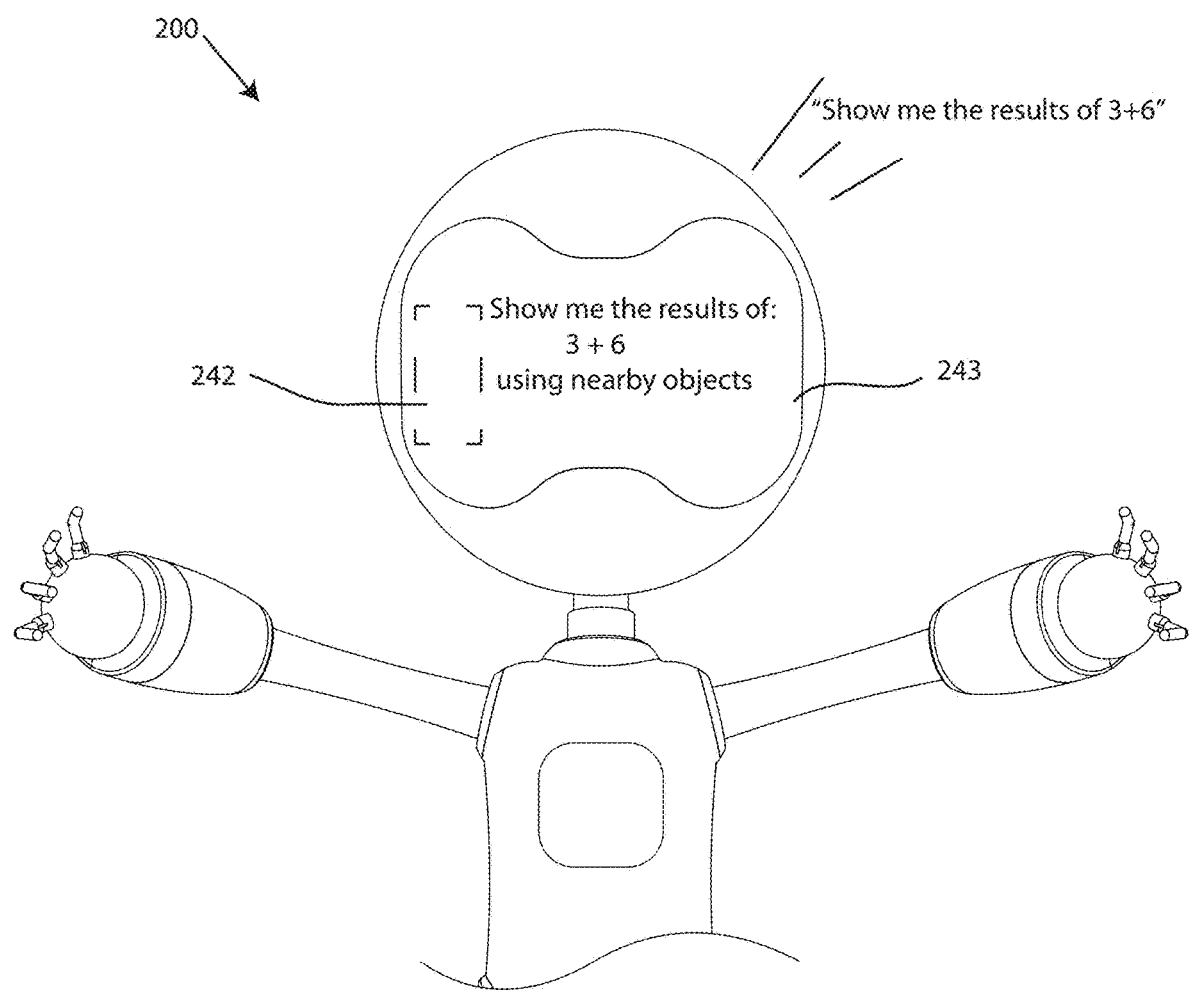
FIG. 8 depicts a schematic view of a robot challenging a user to complete mathematical challenge, in accordance with embodiments of the present invention.

By way of another example, the interactive math mode of the portable computing device 110 can be used to challenge the user to arrange objects consistent with an answer to a mathematical challenge. FIG. 8 depicts a schematic view of a robot 200 challenging a user to complete a mathematical challenge, in accordance with embodiments of the present invention. In the illustrated embodiment, the robot 200 asks the user to "Show me the results of 3+6" while also displaying the message "Show me the results of: 3+6 using nearby objects." In response, the user searches the user's environment and finds any objects (e.g. crayons, shoes, toys, balls, etc.), and arranges a total number of objects that equals the answer to "3+6", in front of the camera 242 of the robot 200. The robot 200 obtains the image data associated with the arrangement of objects, and confirms that the user has arranged a total of nine objects. The robot 200 confirms that the user has correctly completed the challenge, and audibly outputs "Good Job" while also displaying a message "Nice Work!!!" on the display 243. The interactive feedback alerts the user to a successful response to the request/challenge. The user's score increases. However, if the user arranged less than nine or more than nine objects in front of the camera 242 of the robot 200, the robot 200 would provide feedback to the user that the user was incorrect or failed the challenge. The interactive feedback alerts the user to an unsuccessful response to the challenge, and provides the user with the correct response so that the user continues to learn. The user's score decreases.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the assisted learning system 100 uses specific hardware, such as camera, for identifying a number and/or spatial arrangement of objects within a real-world environment. The GUI of the specialized device (e.g. robot 200) is modified or otherwise augmented to present custom results to the user. The assisted learning system 100 provides a technical solution by augmenting GUIs of specialized devices based on a set outcomes determined by the operation of specific hardware to determine a failure or success to mathematical challenges, using objects in environments.

Figure 9:
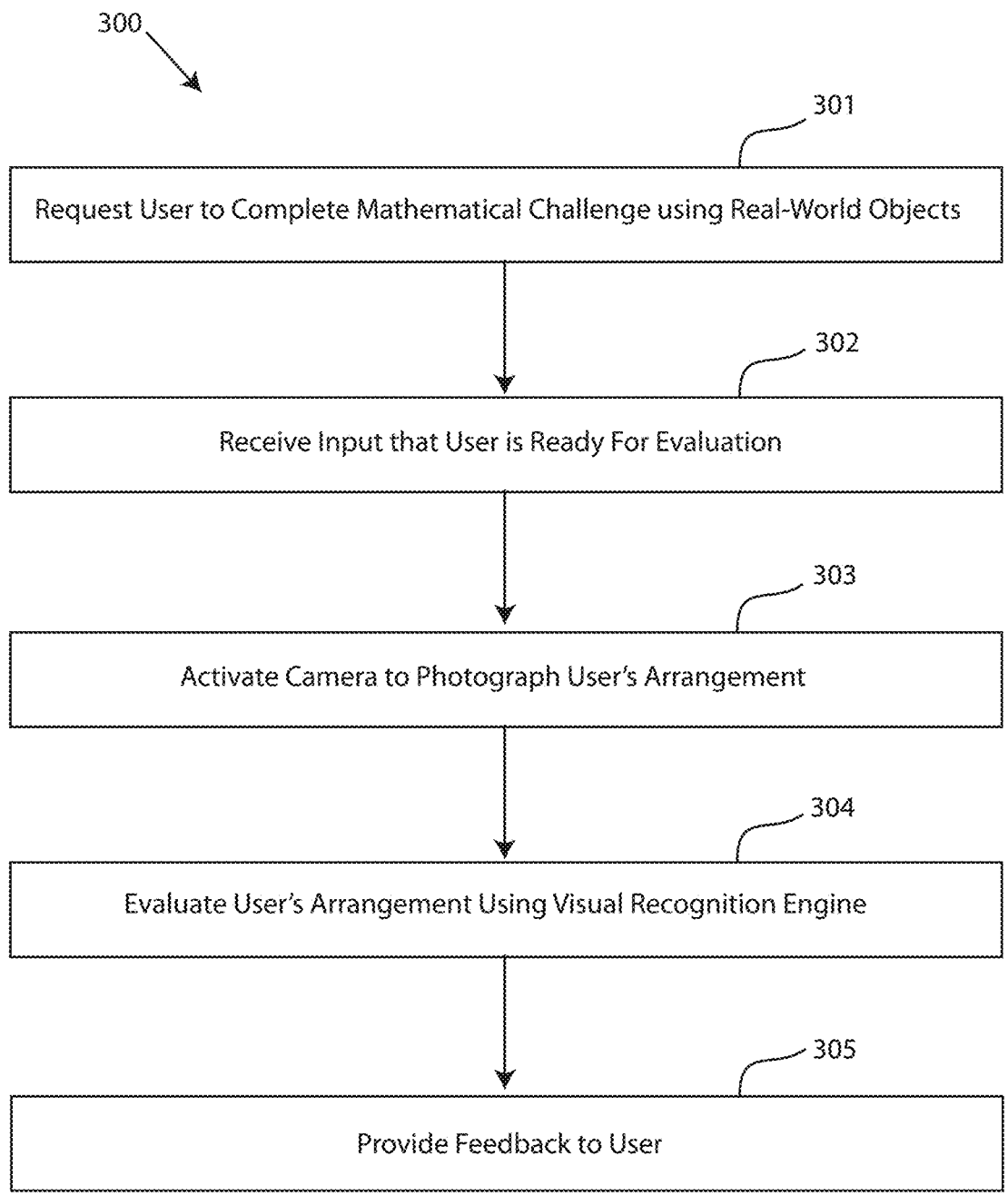
FIG. 9 depicts a flow chart of a method for assisted-learning with a portable computing device, in accordance with embodiments of the present invention.
Figure 11:
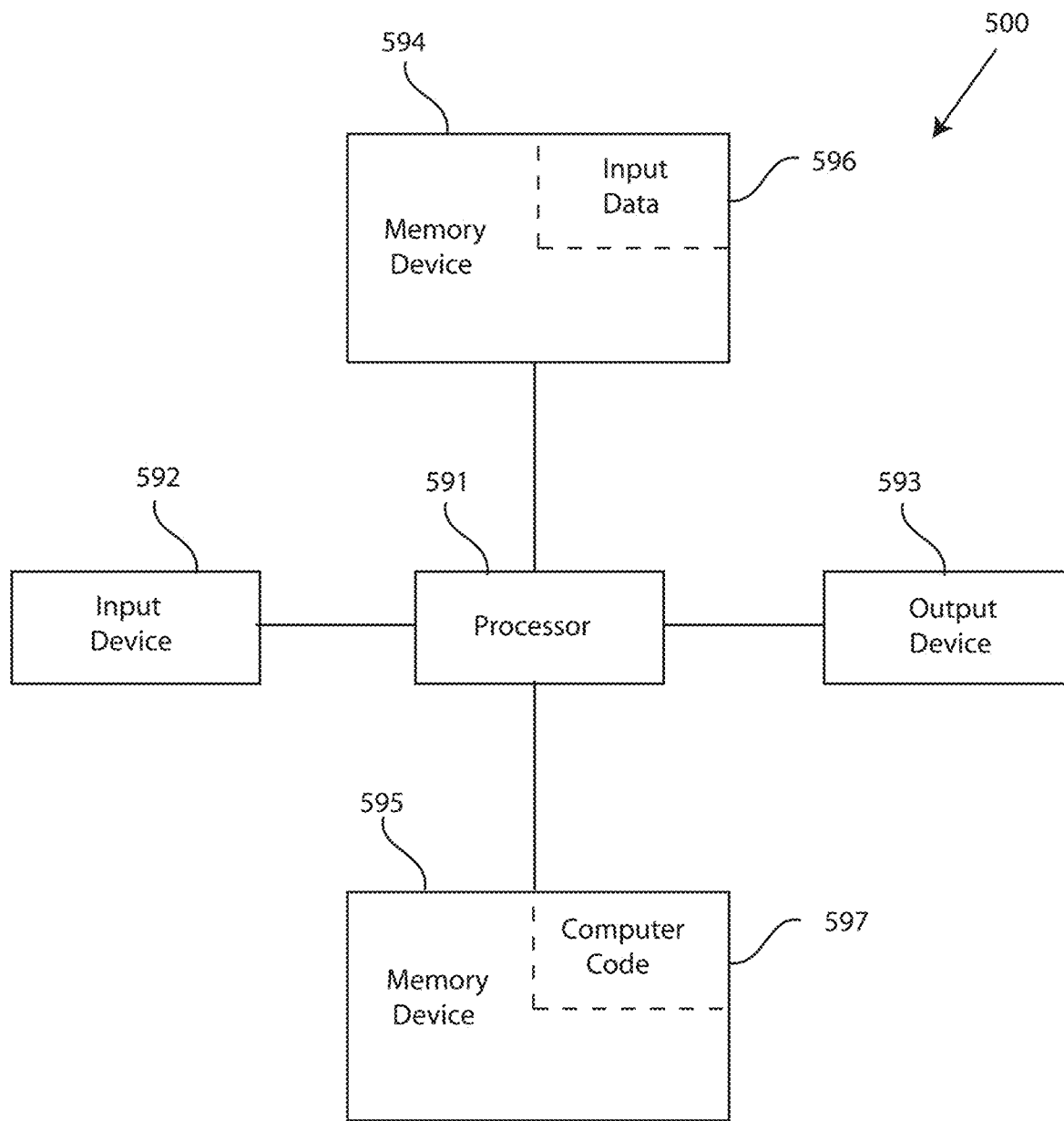
FIG. 11 depicts a block diagram of a computer system for an assisted learning system of FIGS. 1-8, capable of implementing a method for assisted-learning with a portable computing device of FIGS. 9-10, in accordance with embodiments of the present invention.

Referring now to FIG. 9, which depicts a flow chart of a method 300 for assisted-learning with a portable computing device, in accordance with embodiments of the present invention. One embodiment of a method 300 or algorithm that may be implemented for assisted-learning with a portable computing device with the assisted learning system 100 described in FIGS. 1-8 using one or more computer systems as defined generically in FIG. 11 below, and more specifically by the specific embodiments of FIG. 1.

Embodiments of the method 300 for assisted-learning with a portable computing device, in accordance with embodiments of the present invention, may begin at step 301 wherein step 301 requests the user to complete mathematical challenges using real-world objects. Step 302 optionally receives input from a user that the user is ready for evaluation. Step 303 activates the camera to photograph the user's arrangement. Step 304 evaluates the user's arrangement using a visual recognition engine. Step 305 provides feedback to the user.

Figure 10:
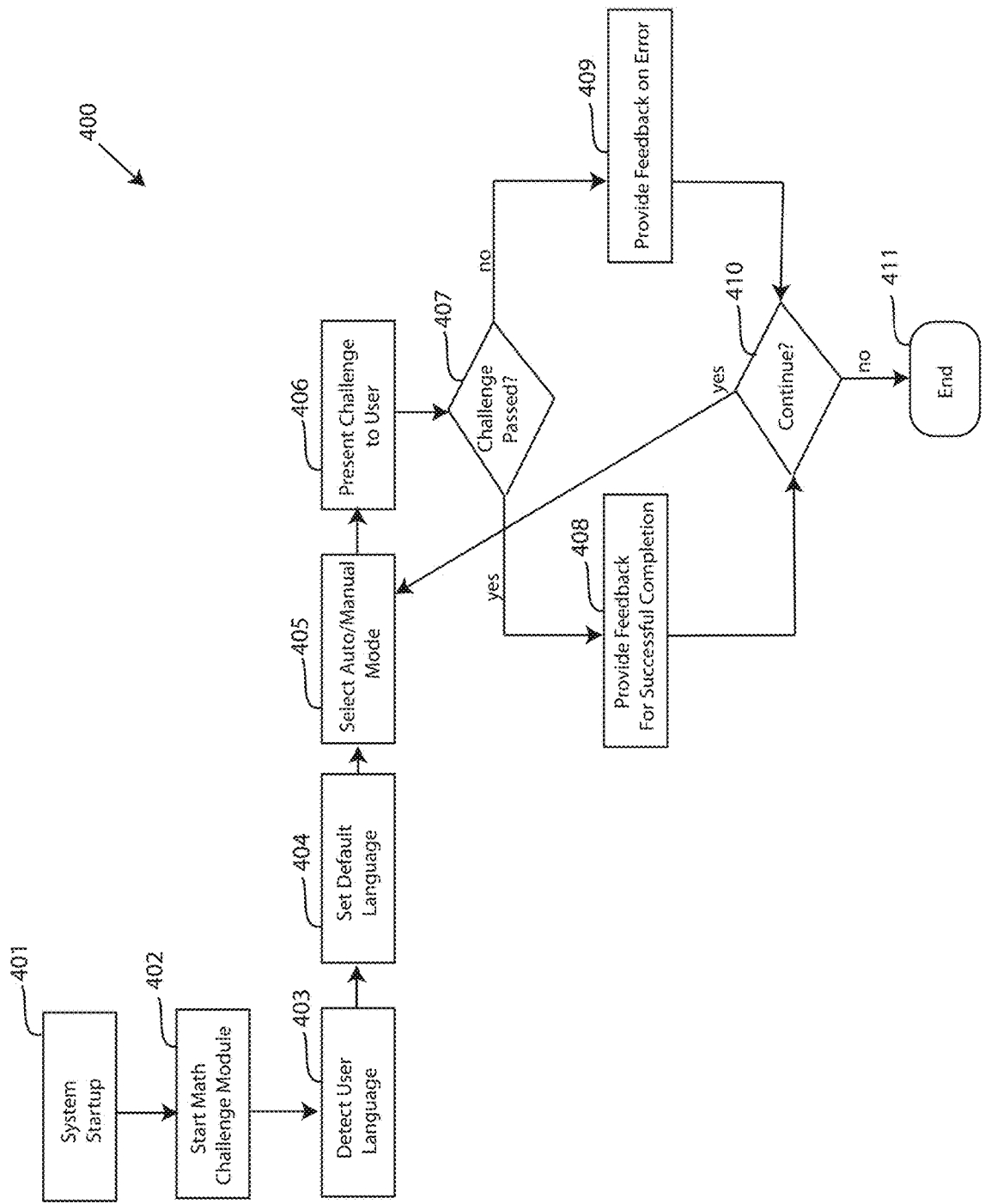
FIG. 10 depicts a detailed flow chart of a mode of the portable computing device, in accordance with embodiments of the present invention.

FIG. 10 depicts a detailed flow chart of a mode 400 of the portable computing device 110, in accordance with embodiments of the present invention. Step 401 starts the system for a game mode of the portable computing device 110. Step 402 starts/initiates a selected game mode of the portable computing device 110 (e.g. launches a challenge module of the application). Step 403 detects the user language and step 404 sets the detected user language as the default language for the voice responses to the user. Step 405 receives the selection of the user for an automatic mode (e.g. automatically advancing to stages of evaluation) or manual mode (e.g. receive user input when arrangement is ready). Step 406 presents the challenge to the user. Step 407 determines whether the user challenges passed the challenge. If yes, then step 408 provides feedback to the user for successful completion of the challenge. If no, then step 409 provides feedback to the user on the error. Step 410 determines whether the user desires to continue to another challenge. Step 411 ends the mode 400.

Figure 12:
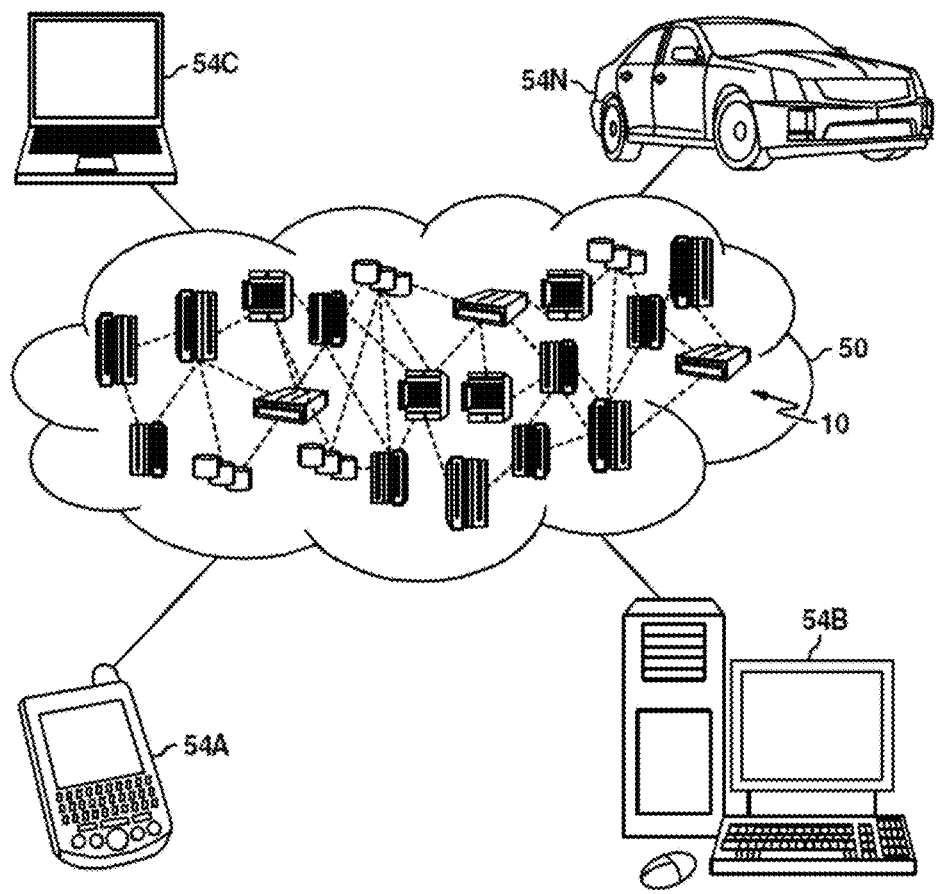
FIG. 12 depicts a cloud computing environment, in accordance with embodiments of the present invention.

FIG. 12 depicts a block diagram of a computer system for the assisted learning system 100 of FIGS. 1-8, capable of implementing methods for assisted-learning with a portable computing device of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for assisted-learning with a portable computing device in the manner prescribed by the embodiments of FIGS. 9-10 using the assisted learning system 100 of FIGS. 1-8, wherein the instructions of the computer code 597 may be executed by processor 591 via memory device 595. The computer code 597 may include software or program instructions that may implement one or more algorithms for implementing the method for assisted-learning with a portable computing device, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 12.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to assisted learning with a portable computing device. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to provide assisted-learning with a portable computing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for assisted-learning with a portable computing device. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for assisted-learning with a portable computing device.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher l of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community,r public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
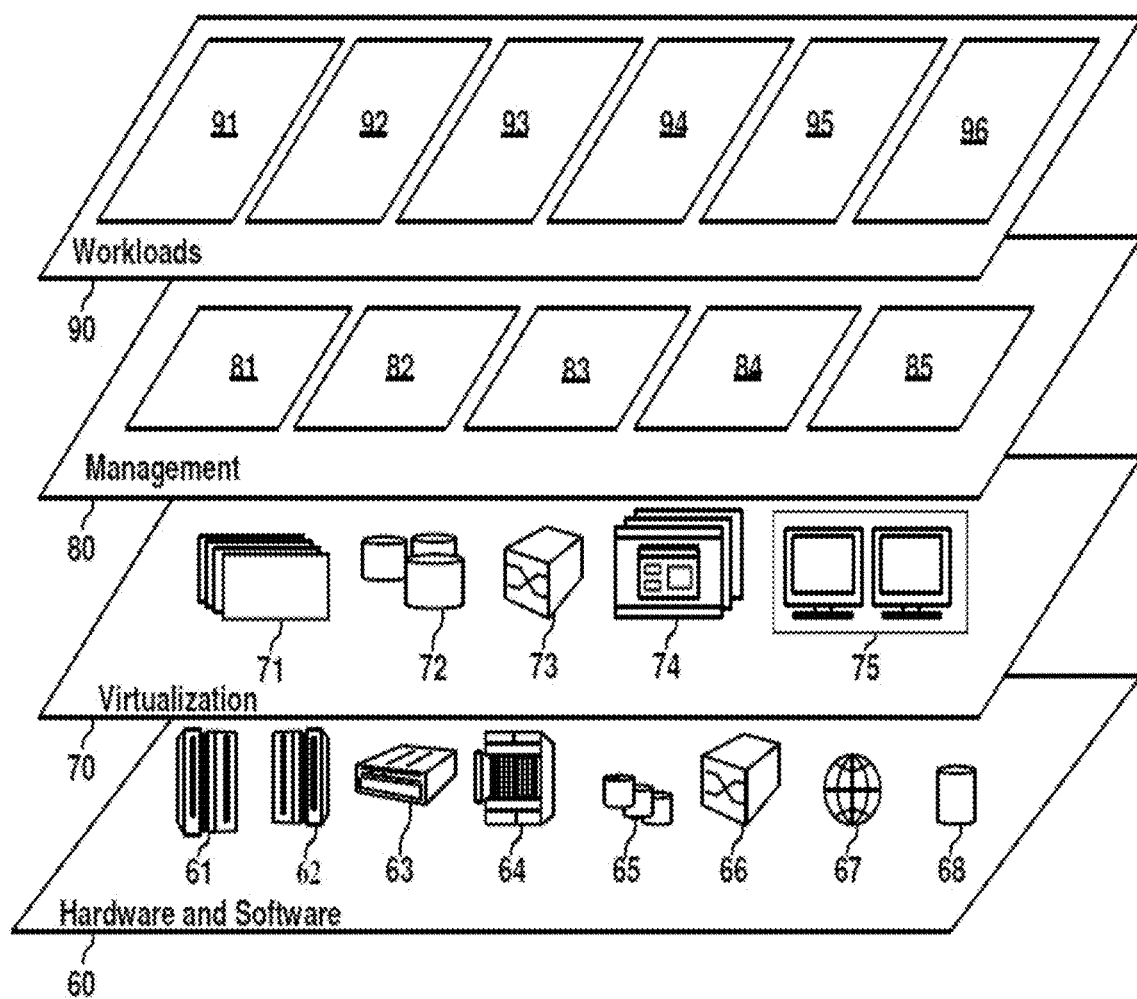
FIG. 13 depicts abstraction model accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing sources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and instant tongue sampling and diagnosis 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assisted-learning with a robot including a head portion and a body portion, the ethod comprising:
    requesting, by a processor of a computing system, that a user complete a mathematical challenge by locating a group of real-world objects of a specific type and a specific shape from an environment containing a plurality of real-world objects of multiple different types and shapes, and arranging the group of real-world objects to form an arrangement according to the mathematical challenge;
    receiving, by the processor, an input from the user that the arrangement is complete;
    activating, by the processor, a camera included in the head portion of the robot and located in the environment with the user to capture an image of the arrangement, wherein the processor receives the image of the arrangement from the robot over a network;
    evaluating, by the processor, the arrangement using a visual recognition engine to determine whether the group of the real-world objects is a correct type and a correct shape of real-world object, and ii) the arrangement of the group of real-world objects successfully completes the mathematical challenge; and
    providing, by the processor, at least one of a visual feedback on a display included in the head portion of the robot and an audible feedback to the user,
    wherein the robot supports a plurality of modes of operation, including a math mode with the mathematical challenge, a spatial recognition mode presenting the mathematical challenge, a training mode, and a game mode such that the user selects a mode from the plurality of modes of operation by interacting with the display included in the head portion of the robot.

2. The method of claim I, wherein the training mode trains the robot to scan and identify a group of objects arranged by the user.

3. The method of claim 1, further comprising:
    detecting, by the processor, that the arrangement is not successfully captured by the camera of the robot;
    providing, by the processor, feedback to the user to reposition the robot to improve image capturing of the arrangement; and
    activating, by the processor, the camera to capture digital data representing the arrangement.

4. The method of claim 1, wherein providing visual feedback comprises: displaying, by the processor, a congratulatory message on the display included in the head portion of the robot, and initiating, by the processor, a musical sequence.

5. The method of claim 1, further comprising: increasing, by the processor, a score of the user in the game mode, in response to determining that the user successfully completed the mathematical challenge.

6. The method of claim 5, further comprising: decreasing, by the processor, the score of the user in the game mode, in response to determining that the user did not successfully complete the mathematical challenge.

7. The method of claim 1, wherein the visual recognition engine counts a number of real-world objects in the image to be compared with a number of real-world objects required in the mathematical challenge.

8. The method of claim 1, wherein the mathematical challenge requires the user to sort a predetermined number of real-world objects according to a size of each of the real-world objects.

9. A computing system, comprising:
a processor;
a memory device coupled to the processor; and
a computer readable storage device coupled to the processor, wherein the storage device contains program code executable by the processor via the memory device to implement a method for assisted-learning with a robot including a head portion and a body portion, the method comprising:
requesting, by a processor of a computing system, that a user complete a mathematical challenge by locating a group of real-world objects of a specific type and a specific shape from an environment containing a plurality of real-world objects of multiple different types and shapes, and arranging the group of real-world objects to form an arrangement according to the mathematical challenge;
receiving, by the processor, an input from the user that the arrangement is complete;
activating, by the processor, a camera included in the head portion of the robot and located in the environment with the user to capture an image of the arrangement, wherein the processor receives the image of the arrangement from the robot over a network;
evaluating, by the processor, the arrangement using a visual recognition engine to determine whether i) the group of the real-world objects is a correct type and a correct shape of real-world object, and ii) the arrangement of the group of real-world objects successfully completes the mathematical challenge and
providing, by the processor, at least one of a visual feedback on a display included in the head portion of the robot and an audible feedback to the user,
wherein the robot supports a plurality of modes of operation, including a math mode with the mathematical challenge. a spatial recognition mode presenting the mathematical challenge, a training mode, and a game mode such that the user selects a mode from the plurality of modes of operation by interacting with the display included in the head portion of the robot.

10. The computing system of claim 9, wherein the training mode trains the robot to scan and identify a group of objects arranged by the user.

11. The computing system of claim 9, wherein providing visual feedback comprises: displaying, by the processor, a congratulatory message on the display included in the head portion of the robot, and initiating, by the processor, a musical sequence.

12. The computing system of claim 9, further comprising: increasing, by the processor, a score of the user in the game mode, in response to determining that the user successfully completed the athematical chiller.

13. The computing system of claim 12, further comprising:
decreasing, by the processor, the score of the user in the game mode, in response to determining that the user did not successfully complete the mathematical challenge.

14. The computing system of claim 9, wherein the visual recognition engine counts a number of real-world objects in the image to be compared with a. number of real-world objects required in the mathematical challenge.

15. The computing system of claim 9, wherein the mathematical challenge requires the user to sort a predetermined number of real-world objects according to a sizeof each of the real-world objects.

16. A computer program product, comprising a computer readable hardware storage device storing a computer readable program code, the computer readable program code comprising an algorithm that when executed by a computer processor of a computing system implements a method for assisted-learning with a robot including a head portion and a body portion, the method comprising:
requesting, by a processor of a computing system, that a user complete a mathematical challenge by locating a group of real-world objects of a specific type and a specific shape from an environment containing a plurality of real-world objects of multiple different types and shapes, and arranging the group of real-world objects to form an arrangement according to the mathematical challenge;
receiving, by the processor, an input from the user that the arrangement is complete;
activating, by the processor, a camera included in the head portion of the robot and located in the environment with the user to capture an image of the arrangement, wherein the processor receives the image of the arrangement from the robot over a network;
evaluating, by the processor, the arrangement using a visual recognition engine to determine whether i) the group of the real-world objects is a correct type and a correct shape of real-world object, and ii) the arrangement of the group of real-world objects successfully completes the mathematical challenge and
providing, by the processor, at least one of a visual feedback on a display included in the head portion of the robot and an audible feedback to the user,
wherein the robot supports a plurality of modes of operation, including a math mode with the mathematical challenge, spatial recognition mode presenting the mathematical challenge, a training mode, and a game mode such that he user selects a mode from the plurality of modes of operation by interacting with the display included in the head portion of the robot.

17. The computer program product of claim 16, wherein the training mode trains the robot to scan and identify a group of objects arranged by the user.

18. The computer program product of claim 16, wherein providing visual feedback comprises: displaying, by the processor, a congratulatory message on the display included in the head portion of the robot, and initiating, by the processor, a musical sequence.

19. The computer program product of claim 16, further comprising: increasing, by the processor, a score of the user in the game mode, in response to determining that the user successfully completed the mathematical challenge.

20. The computer program product of claim 19, further comprising: decreasing, by the processor, the score of the user in the game mode, in response to determining that the user did not successfully complete the mathematical challenge.

\* \* \* \* \*